(12) United States Patent
Przybycin (10) Patent No.: US 11,441,543 B2
(45) Date of Patent: Sep. 13, 2022

(54) SYSTEM RECORDING THE COLLISIONS OF FLYING ANIMALS WITH WIND TURBINES, ITS APPLICATION AND MANNER OF RECORDING COLLISIONS OF FLYING ANIMALS WITH WIND TURBINES WITH THE USE OF THE SYSTEM

(71) Applicant: Michal Przybycin, Poznan (PL)

(72) Inventor: Michal Przybycin, Poznan (PL)

( * ) Notice: Subject to any disclaimer, the term of this patent is extended or adjusted under 35 U.S.C. 154(b) by 333 days.

(21) Appl. No.: 16/631,981

(22) PCT Filed: Jul. 16, 2018

(86) PCT No.: PCT/IB2018/055240
§ 371 (c)(1),
(2) Date: Jan. 17, 2020

(87) PCT Pub. No.: WO2019/016670
PCT Pub. Date: Jan. 24, 2019

(65) Prior Publication Data
US 2020/0166018 A1    May 28, 2020

(30) Foreign Application Priority Data

Jul. 19, 2017   (PL) .......................................... 422278

(51) Int. Cl.
*F03D 80/00*    (2016.01)
*F03D 17/00*    (2016.01)

(52) U.S. Cl.
CPC .......... *F03D 17/00* (2016.05); *F05B 2260/80* (2013.01); *F05B 2270/805* (2013.01);
(Continued)

(58) Field of Classification Search
CPC .................. F03D 17/00; F05B 2260/80; F05B 2270/8041; F05B 2270/8042; F05B 2270/805
See application file for complete search history.

(56) References Cited

U.S. PATENT DOCUMENTS 8,742,977 B1 *  6/2014  Piesinger ................ G01S 13/93
                                                    342/159
9,521,830 B2 * 12/2016  Wenger ................ G06V 40/103
(Continued)

OTHER PUBLICATIONS

Bhavioral Responses of Bats to Operating Wind Turbines; Journal of Wildlife Management; 72(1):123-132; 2008.*
(Continued)

*Primary Examiner* — Ninh H. Nguyen
(74) *Attorney, Agent, or Firm* — Maschoff Brennan (57) ABSTRACT

The object of the invention is a system recording the collisions of flying animals (9) with wind turbines (1) and indicating where they fell on the ground, which comprises a wind turbine (1) composed of a tower (2), a nacelle (3), a rotor (4) with blades (5) and a sensor unit comprising one sensor (6) and peripheral devices of the sensor, characterised in that the sensor (6) mounted on the nacelle (3) and/or tower (2) of the wind turbine (1) is a LIDAR sensor or a 3D light field camera or a 3D radar scanning the space around the wind turbine (1) in the field of view (7) of the sensor (6). The object of the invention is also the method of application of the above described system for recording the collisions of flying animals (9) with wind turbines (1) and indicating where they fell on the ground and the application of the system.

16 Claims, 6 Drawing Sheets

(52) U.S. Cl.
CPC ............... *F05B 2270/8041* (2013.01); *F05B 2270/8042* (2013.01)

(56) References Cited

U.S. PATENT DOCUMENTS

| | | | | |
|---|---|---|---|---|
| 9,775,337 | B2* | 10/2017 | Duncan | ............... A01M 29/18 |
| 2007/0171396 | A1* | 7/2007 | Harris | .................. G01S 7/493 |
| | | | | 356/28 |
| 2015/0204973 | A1* | 7/2015 | Nohara | ............... G01S 13/726 |
| | | | | 342/107 |
| 2016/0050889 | A1 | 2/2016 | Wenger et al. | |
| 2018/0171972 | A1* | 6/2018 | Merz | ................. G05B 13/026 |
| 2019/0325254 | A1* | 10/2019 | Jorquera | .............. F03D 7/0264 |

OTHER PUBLICATIONS

Pandey A et al: "Development of a cost-effective system to monitor wind turbines for bird and bat collisions-phase I: sensor system feasibility study" California Energy Commission, Pier Energy-Related Environmental Research, No. CEC-500-2007-0004, Jan. 1, 2006, pp. I-VIII, 1.

Verhoef J P et al: "WT-Bird, A low cost solution for detecting bird collisions", Energy Research Center of the Netherlands (ECN), No. ECN-C-04-046, Jan. 1, 2004, pp. 1-46.

Mehmet Hanagasioglu et al: Investigation of the effectiveness of bat and bird detection of the DTBat and DTBird systems at Calandawind turbine May 15, 2015, pp. 10, 84, 85.

Arc Consultoria Medioambiental: "Control Y Seguimiento de la incidencia del Parque Eolico de Badaia Sobre la Avifauna y los quiropteros" Feb. 1, 2013, pp. 1-67.

\* cited by examiner

SYSTEM RECORDING THE COLLISIONS OF FLYING ANIMALS WITH WIND TURBINES, ITS APPLICATION AND MANNER OF RECORDING COLLISIONS OF FLYING ANIMALS WITH WIND TURBINES WITH THE USE OF THE SYSTEM

The subject matter of the invention is a system recording the collisions of flying animals with wind turbines and identifying the location of their fall to the ground, its application and manner of recording the collisions of flying animals with wind turbines with the use of the proposed system.

Flying animals like birds or bats may collide with wind turbines, in particularly those with rotating blades. Such collision victims are the animals that have crashed into a wind turbine or sustained injury due to barotrauma that is due to the injury of the respiratory tract in effect of the differences in pressure in the zone of the rotating blades of a wind turbine. Therefore, a need arises for a system that would enable us to identify a collision of animals with a wind turbine and to identify the location where it fell in order to, among others, monitor the number of collisions or to provide help to the injured animals.

At the present state of knowledge, there are other recording devices, e.g. US 2011192212 A1, that record a blade of a wind turbine striking flying animals by way of recording the sound waves generated in the rotor blade as a result of striking the body of an animal. This device enables to precisely record the number of collisions between flying animals and wind turbines.

Whereas US 2013050400 A1 presents a device which records flying animals with a camera and which, based on the camera picture, changes the work of the wind turbine.

At the present state of knowledge, there are also devices scanning the area around the wind turbine, which switch off the wind turbine after flying animal have been recorded in the vicinity thereof (JP 2009257322).

Publication of Mehmet Hanagasioglu et al: "Investigation of the effectiveness of bat and bird detection of the DTBat and DTBird systems at Calandawind turbine" presents the application of a laser rangefinder located on the ground (outside the wind turbine) in a place from which the viewer can manually measure the bird location in the air to define their position with regard to the wind turbine.

Whereas the publication Pan Dey A et al: "Development of a cost-effective system to monitor wind turbines for bird and bat collisions—phase I: sensor system feasibility study", CALIFORNIA ENERGY COMMISSION, PIER ENERGY-RELATED ENVIRONMENTAL RESEARCH presents a system of a wind turbine and a fiber-optic sensor, which can indirectly record the coordinates of the object that has crashed into the rotor blades. To make it feasible under the aforementioned invention, the position of the rotor with respect to the cardinal points should be monitored on continuous basis and the length of the blades provided with the sensors should be known. Sensors of this type record the animals crash with the blades on the principle of recording vibrations. Therefore the location of the animal can be read as secondary data in the 3D space. However, the sensor cannot monitor the trajectory of animals and therefore, cannot locate the position where the animal has fallen on the ground after the collision.

Prior patent pending of the inventor of this solution registered under no. P.416126 presents a device recording the collisions of flying animals with wind turbines and indicating where they fell on the ground, the device is provided with at least two sensors mounted peripherally on at least two heights of the wind turbine tower, communicated with a control-recording unit via wired or wireless data transmission. The sensors described in that solution are among others laser sensors, photoelectric optical rangefinders, space scanners. This device enables to record the trajectory of an animal flight by uploading at least two coordinates in space: via the upper and lower sensor and to process the reading through the control-recording unit to define the trajectory of the animal after the collision with the rotor blade and to identify the location where it shall hit the ground.

The object of the invention is a system recording the collisions of flying animals with wind turbines and indicating the position where they have fallen to the ground, which comprises:
 a wind turbine composed of a tower, a nacelle and a rotor with blades,
 a sensor system composed of a sensor unit and peripheral devices,
 characterized in that the sensor is mounted on the wind turbine nacelle and/or wind turbine tower, and the sensor is a LIDAR sensor or a 3D light field camera or a 3D radar scanning the space around the wind turbine in the field of view of the sensor.

Preferably, the sensor is mounted on the wind turbine nacelle and has a horizontal field of view of 180°.

Preferably, the sensor is mounted on the wind turbine tower and has a horizontal field of view of 360°.

Preferably, the sensor is a LIDAR sensor. Preferably, the sensor is a radar. Also preferably, the sensor is a 3D light field camera.

Preferably, the sensor range is about 300 m.

Preferably, the system characterized in that it additionally comprises one or more sensors mounted on the wind turbine nacelle and/or on the wind turbine tower in such manner that one sensor and further sensors are communicated with one another by way of wired or wireless communication and cover multiple fields of view of a single sensor.

Preferably, the sensor is mounted on the wind turbine tower below the rotor blade range.

Preferably, the system additionally contains at least one device recording the image of a falling animal.

Preferably, the recording devices are video cameras, night vision cameras, thermal imaging cameras, photo cameras.

The object of the invention is also the method of recording flying animals collisions with wind turbines with the use of the above described system, which consists in tracking the trajectory of a falling animal after a collision with any part of the wind turbine, in particularly with the blades, via the sensor characterized in that it continuous monitors the coordinates and speed of the falling animals in 3D space within the range of the field of view of the sensor once the animal has entered the field of view of the sensor until it has fallen to the ground.

The object of the invention is also the application of the above described system for recording flying animals collisions with wind turbines and indicating where they fell on the ground.

Fundamental difference between solutions already known in the present state of knowledge and this invention is the use of sensors scanning 3D space mounted on the wind turbine and the construction of the system, in which there is no need to use at least two sensors in order to sequentially collect data on the location of a falling animal (first upper sensor, then lower sensor).

This invention is implemented with the use of a 3D space scanning sensor and based on the principles of operation of this type of sensors, only one such sensor shall be sufficient to ensure efficient operation of the invention. Application of another sensor, integrated with the first one, is not a mandatory criterion to be met for the purpose of the invention, however, allows for the extended coverage of 3D space around the wind turbine in terms of the "field of view" of a sensor. Several sensors can also be integrated together to ensure possibly the most extensive coverage of 3D space around the wind turbine—in such a situation we can talk about multiple of field of view. Multiple of field of view are composed of the ranges of the fields of view of several sensors. The term "multiple of field of view" includes overlapping and non-overlapping fields of view of the sensors.

The scope of routine tasks of an expert shall include the adjustment of the number of sensors and their location on the wind turbine to obtain the optimal coverage of 3D space around the wind turbine.

The sensors that enable to continuously scanning of 3D space, which make part of the system, as per the invention, are the sensors available on the market. Such sensors can be LIDAR sensors selected from a group of sensors characterised with a horizontal field of view of minimum 180° and a range of detection that allows for scanning between the wind turbine nacelle and the subgrade, e.g. Quanergy M8-1, Velodyne VLS-128, Velodyne HDL-64, Velodyne HDL-32, Velodyne VLP-32C, Velodyne VLP-16. Such sensors can also be 3D light field cameras—3D imaging cameras (e.g. Raytrix 3D light field). Such sensors can also be short-range radars e.g. Echodyne, SiRad Easy.

The sensors can be mounted on any wind turbine.

In the preferably example of embodiment of the invention the sensor presents Velodyne VLS-128 sensor. It is a LIDAR sensor of the horizontal field of view of 360° and vertical field of view of 40°. However, the invention also provides the application of other LIDAR sensors characterised with other parameters of the fields of view. The more extensive and spherical the recording zone of a single sensor is, the fewer number of sensors shall be required to be installed in the system.

An expert shall be liable for the selection of appropriate sensor for the purpose of the invention. Depending on the characteristics of the sensor, e.g. the parameters of the field of view and the parameters of the wind turbine, e.g. its height, to cover appropriate 3D space around the wind turbine possible is selection of an appropriate sensor or sensors that can be integrated for realization of invention. The choice of sensor will depend on i.a:
  parameters of a wind turbine, e.g. its height;
  field of view of a sensor;
  subgrade of the wind turbine (land, water);
  day monitoring or day and night monitoring.

As above mentioned, preferably the system can comprise additional components such as: night vision camera, infrared camera, photo camera, preferably mounted on the wind turbine nacelle and switched on by a recording an event through a sensor. The purpose of additional components is to obtain data about a falling object other than the data recorded by the sensor/sensors, such as the colour or shape to determine what type of animal has been the subject of the collision. The system which is the subject of the invention preferably may contain one of the aforementioned components or several of them that will or will not be integrated with the sensor.

An animal killed or injured due to the collision with the wind turbine rotor blade or due to the barotrauma falls towards the ground. The system records its falling by recording the coordinates of the animal trajectory through a sensor which records the object coordinates in the 3D space and records the parameters of the trajectory in the memory of the sensor. The analysis of the coordinates of the trajectory of the animal enables to determine the position where it has fallen to the ground being the place where the animal stops moving in space and where it rapidly changes the flying speed. Data reading and transmission from the sensor, as well as calibration, are possible owing to the data transmission antenna integrated with the sensor. Power can be supplied to the sensor from batteries or external sources of energy. It is possible to use a single sensor or to connect several sensors by way of wired or wireless communication. Should more than one sensor be used, these sensors can be integrated with a central computer that analyses data deriving from all the sensors. In such a situation the antenna is integrated with the computer.

Peripheral devices of a sensor make up standard fit-out of a sensor and are available on the market or they can be selected by an expert for proper operation of the sensor. Software that controls the sensor operations is supplied with the sensor and is adjusted to collecting and analysing data necessary for the realization of the invention.

The sensor allows for recording the coordinates of animal flight in 3D space. Because the distance between the ground and the sensor is known, if the information on the trajectory of an animal flight is known, as well its speed and coordinates of its location in space, the distinguish alive animals from death or injured animals is possible, because the speed and flight direction of dead or injured animals differ from the speed and flight direction of alive animals.

The method according to the invention, enables continuously recording of the trajectory of a falling animal, that is the system, realized the method according to the invention, does not require two or more sensors sequentially collecting data on the position of a falling animal: first the upper one, then the lower one and other ones if included in the system. This invention can be realized with the use of a single sensor only, which enables continuously recording the trajectory of a falling animal, that is it replaces two or more sensors and is not involved in sequential data readings. It may happen that, for technical reasons, e.g. poor visibility, end of detection range, reading will fail to be continuous and the produced image of a recorded trajectory of a flying animal will show dashed lines of irregular length. Such situations cannot be deemed as sequential readings.

Because the system, according to the invention, is composed of known components and their connection renders the not obvious effect is the essence of the invention, this description of characteristics is made by reference to the said components. E.g. a wind turbine is any operating wind turbine and the sensor unit—as aforementioned—is any sensor available on the market, provided with peripheral devices that meet the criteria of the realization of the invention.

The advantages of the invention, in comparison to prior art, are as follows:
  the possibility of recording of barotrauma victims—different from patent US 2011192212 A1 and fiber-optic sensor type;
  the possibility of monitoring the number of collisions of bats and birds with a wind turbine—different from patents US 2013050400 A1, JP 2009257322, DTBat and DTBird systems;

reduction of the number of sensors—different from patent pending P.416126.

For better understanding of the invention idea, one sensor necessary for the realization of invention is marked with digit 6, whereas any other sensor integrated with the sensor 6 has been marked with 6a. This means that the second sensor is marked with 6a and every next sensor, e.g. the third and fourth sensor are also marked 6a.

The field of view of sensor 6, both the horizontal and vertical field of view, has been marked with digit 7 for sensor 6 and 7a for other integrated sensors 6a.

The following designations of the system elements have been used to describe the figures and examples of the invention realization:
1—wind turbine
2—tower
3—nacelle
4—rotor
5—rotor blades
6/6a—sensor
7/7a—field of view of sensor 6/6a;
8—animal
9—trajectory of animal 8 after a collision with a wind turbine 1
10—flight direction of animal The invention is presented in the picture, where:

FIG. 1. presents a side view of the system according to the invention, with a visible position of the sensor/s 6/6a.

The examples below present particular embodiments of the invention. The examples show representative systems according to the invention, they are, however, not intended to limit the invention. The scope of routine tasks of an expert shall include application of general knowledge in the field and the examples presented below as well as the entire description to work out another system, however, within the framework of the registered system, that would fulfil the purpose of the invention.

EXAMPLE 1

Figure 1:
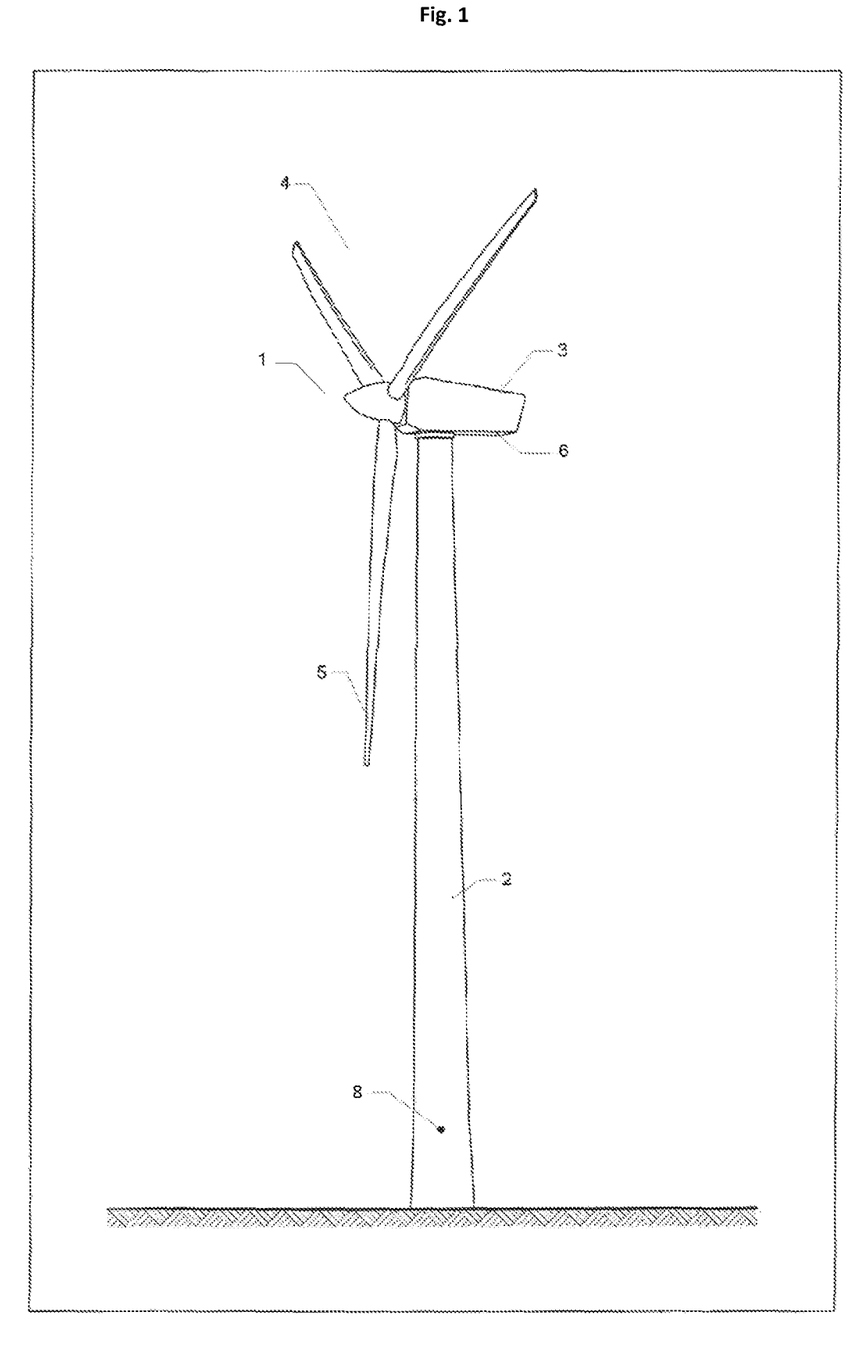
Figure 2:
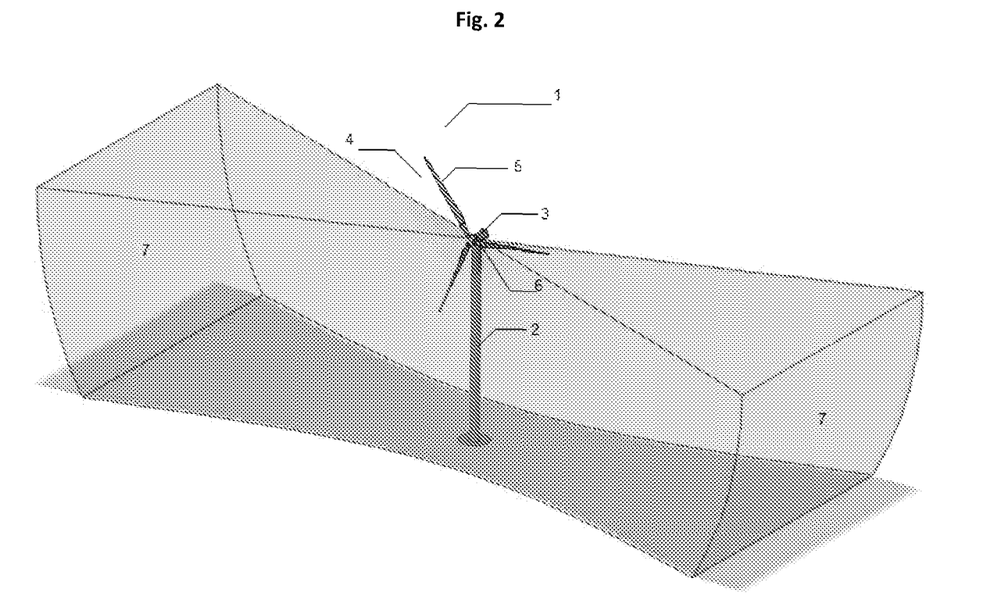
FIG. 2. presents the preferably variant of the system according to the invention, where the system includes one sensor 6 mounted under the floor of the nacelle 3 of the wind turbine 1.

Sensor 6 Velodyne VLS-128 of horizontal field of view 7 360°, vertical field of view 7 40°, range of operation 0-300 m, has been mounted under the floor of the nacelle 3 of the wind turbine 1 in such manner that the axis of the field of view 7 of sensor 6 is directed perpendicularly to the vertical axis of the tower 2 of the wind turbine 1. Sensor 6 records objects in its field of view that are below the height level of the floor of the nacelle 3 of the wind turbine 1 and above the ground. Example 1 is presented in FIG. 2.

EXAMPLE 2

Figure 3:
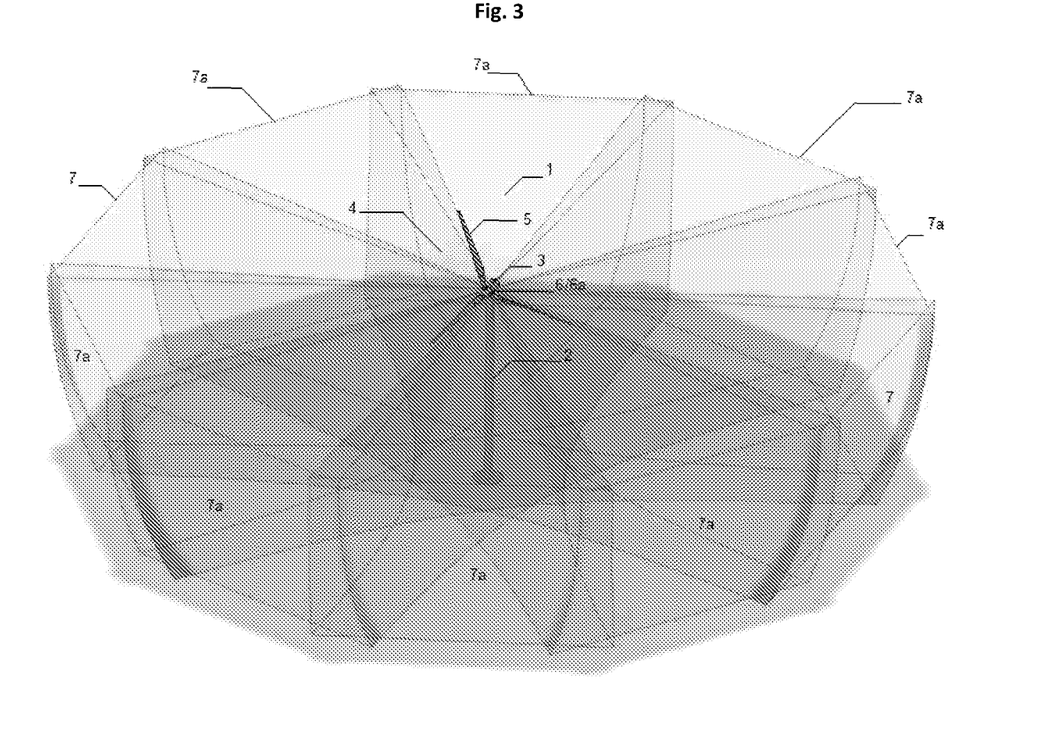
FIG. 3. presents the preferably variant of the system according to the invention, where the system includes five sensors 6, 6a mounted under the floor of the nacelle 3 of the wind turbine 1.

Five sensors 6, 6a Velodyne VLS-128 of horizontal field of view 7 360°, vertical field of view 7 40°, range of operation 0-300 m, have been mounted under the floor of the nacelle 3 of the wind turbine 1 next to one another in such manner that total the multiple of vertical fields of view 7 of individual sensors 6, 6a is 360°. The set of sensors 6, 6a records objects in its field of view 7a that are below the height level of the floor of the nacelle 3 of the wind turbine 1 and above the ground. Example 2 is presented in FIG. 3.

EXAMPLE 3

Figure 4:
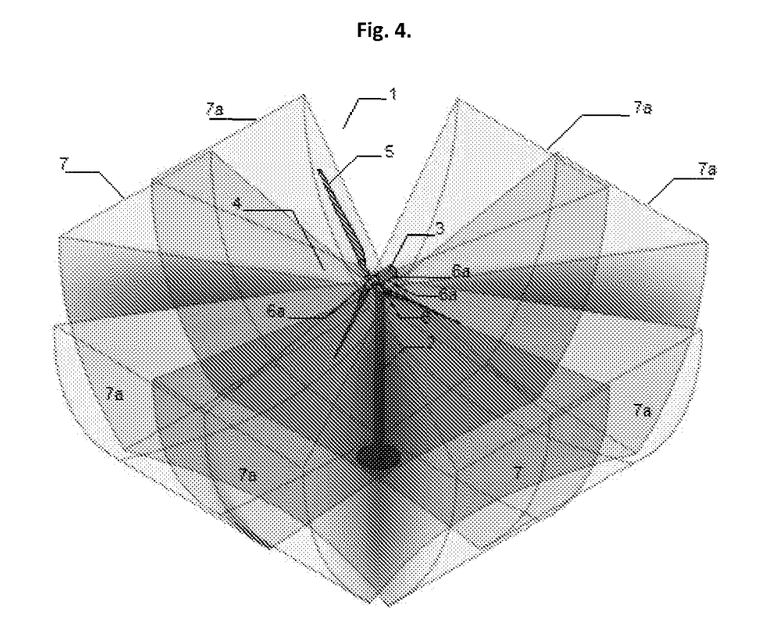
FIG. 4. presents the preferably variant of the system according to the invention, where the system includes four sensors 6, 6a mounted under the floor of the nacelle 3 of the wind turbine 1.
Figure 4A:
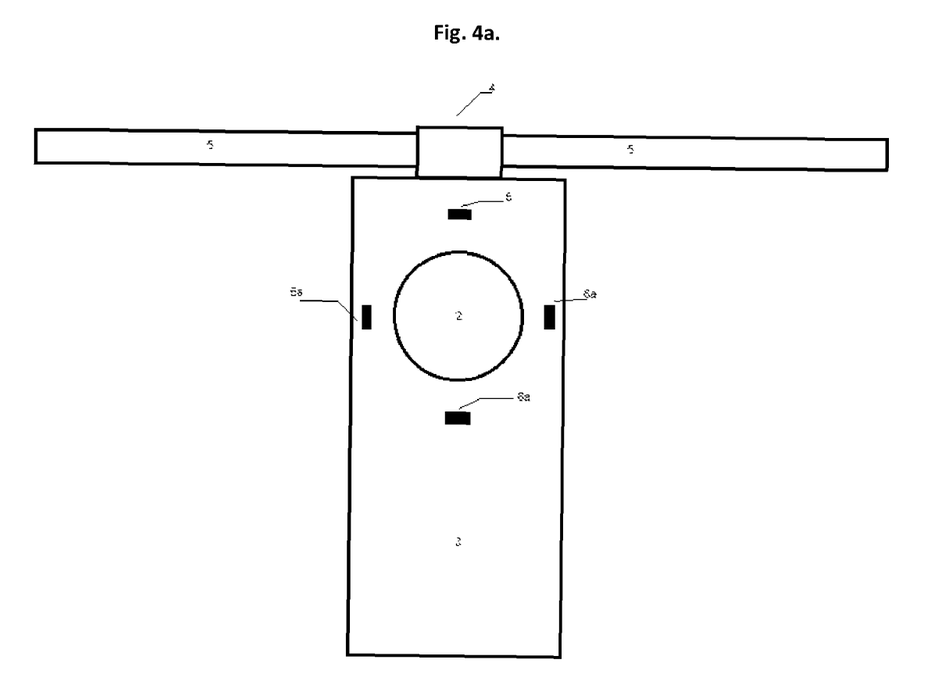
FIG. 4a. presents the location of sensors 6, 6a under the floor of the nacelle 3 of the wind turbine 1 in preferably variant of the system according to the invention, where the system includes four sensors 6, 6a mounted under the floor of the nacelle 3 of the wind turbine 1.

Four sensors 6, 6a Velodyne VLS-128 of horizontal field of view 7 360°, vertical field of view 7 40°, range of operation 0-300 m, have been mounted under the floor of the nacelle 3 of the wind turbine 1, the first one on the side of the rotor 4 of the wind turbine 1, the second one on the rear wall of the nacelle 3 of the wind turbine 1, the third one on the left side of the tower 2 of the wind turbine 1, the fourth one on the right side of the tower 2 of the wind turbine 1 in such manner that the axes of the fields of view 7 of all the sensors 6, 6a are directed perpendicularly to the vertical axis of the tower 2 of the wind turbine 1 and the axes of the fields of view 7 of the third and fourth sensor 6a are directed perpendicularly to the axis of the rotor 4 of the wind turbine 1. The set of sensors 6, 6a records objects in its field of view 7a that are below the height level of the floor of the nacelle 3 of the wind turbine 1 and above the ground. Example 3 is presented in FIGS. 4 and 4a

EXAMPLE 4

Figure 5:
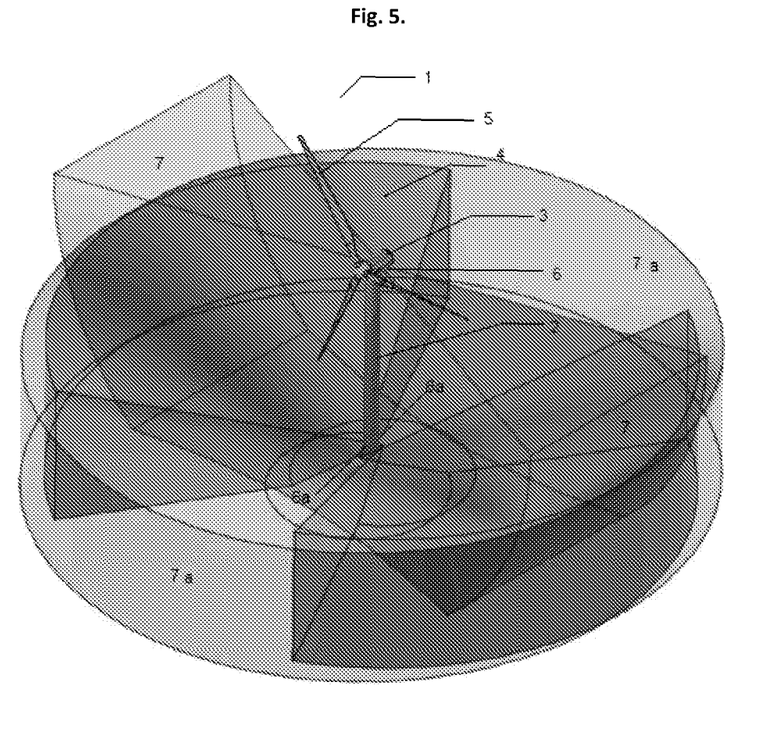
FIG. 5. presents the preferably variant of the system according to the invention, where the system includes three sensors 6, 6a, one mounted under the floor of the nacelle 3 of the wind turbine 1 and two mounted on the tower 2 of the wind turbine 1.

Three sensors 6, 6a Velodyne VLS-128 of horizontal field of view 7 360°, and vertical field of view 7 40°, range of operation 0-300 m, have been mounted as follows: one under the floor of the nacelle 3 of the wind turbine 1 in such manner that the axis of the field of view 7 of sensor 6 is directed perpendicularly to the vertical axis of the tower 2 of the wind turbine 1 and two sensors 6a—on the tower 2 of the wind turbine 1, at the height level of 10 m above the ground, angular distance of 180° to each other in such manner that the axis of the field of view 7 of each of two sensors 6a are directed parallelly to the vertical axis of the tower 2 of the wind turbine 1. The set of sensors 6, 6a records objects in its field of view 7a in such manner that sensor 6 mounted under the floor of the nacelle 3 of the wind turbine 1 records the objects that are below the height level of the floor of the nacelle 3 of the wind turbine 1 and above the ground and sensors 6a mounted on the tower 2 of the wind turbine 1 record objects up to 300 m around the tower 2 of the wind turbine 1, thus increasing the height of the vertical field of view 7 with increasing the distance from the tower 2. The application of two sensors 6a prevents the occurrence of blind spots effected by the tower 3 of the wind turbine 1. Example 4 is presented in FIG. 5.

EXAMPLE 5

Figure 6:
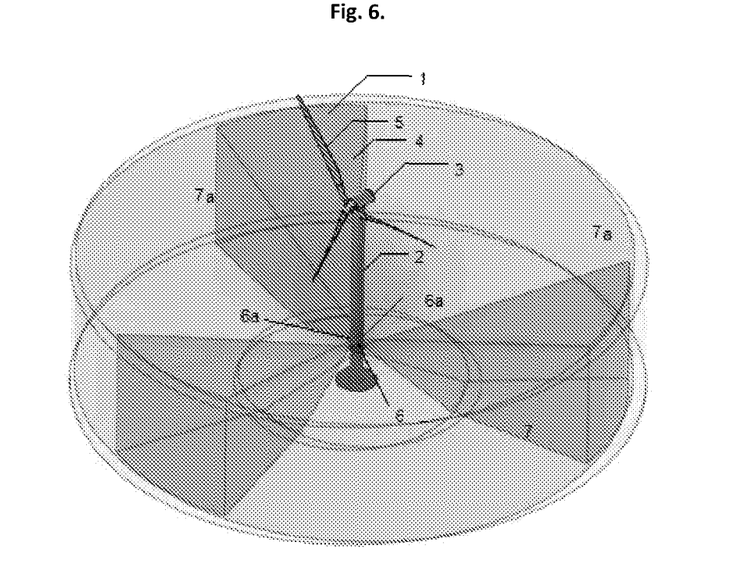
FIG. 6. presents the preferably variant of the system according to the invention, where the system includes three sensors 6, 6a mounted on the tower 2 of the wind turbine 1.
Figure 6A:
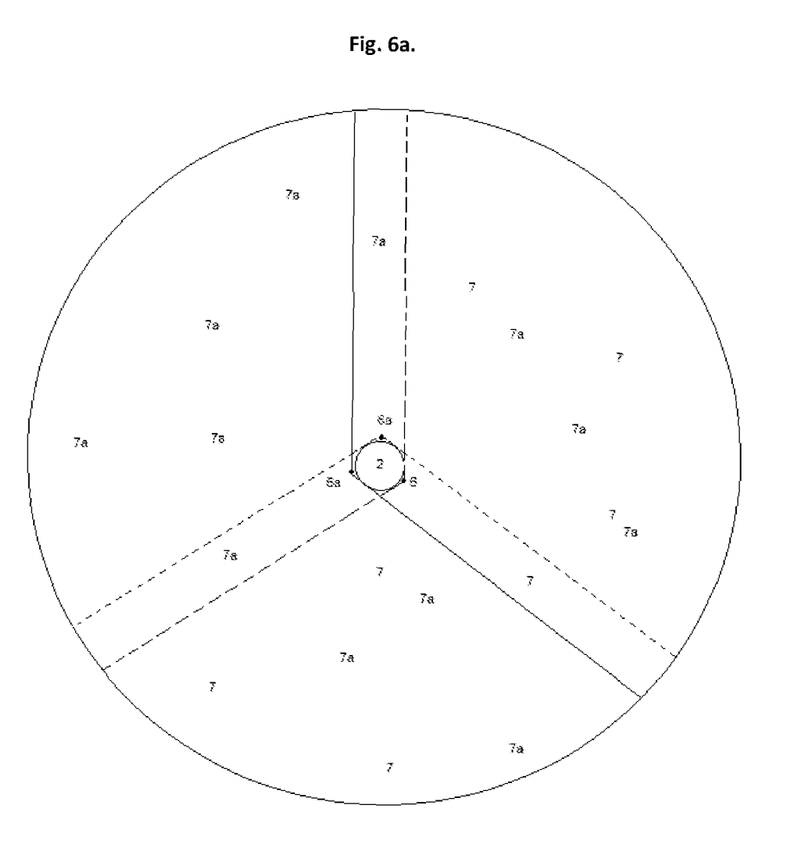
FIG. 6a presents the location of sensors 6, 6a on the tower 2 of the wind turbine 1 in preferably variant of the system according to the invention, where the system includes three sensors 6, 6a mounted on the tower 2 of the wind turbine 1.

The three sensors 6, 6a Velodyne VLS-128 of horizontal field of view 7 360°, vertical field of view 7 40°, range of operation 0-300 m, mounted on the tower 2 of the wind turbine 1, at the height of 15 m above the ground, at the angular distance of 120° to each other, in such manner that the axes of the field of view 7 of each of the three sensors 6, 6a are directed parallelly to the vertical axis of the tower 2 of the wind turbine 1. A set of sensors 6, 6a records objects in its field of view 7a in such manner that sensors 6, 6a record objects up to 300 m around the tower 2 of the wind turbine 1, increasing the height of the vertical field of view with increasing the distance from the tower 2. The application of three sensors 6,6a prevents the occurrence of blind spots effected by the tower 2 of the wind turbine 1. Example 5 is presented in FIGS. 6 and 6a.

EXAMPLE 6

Figure 7:
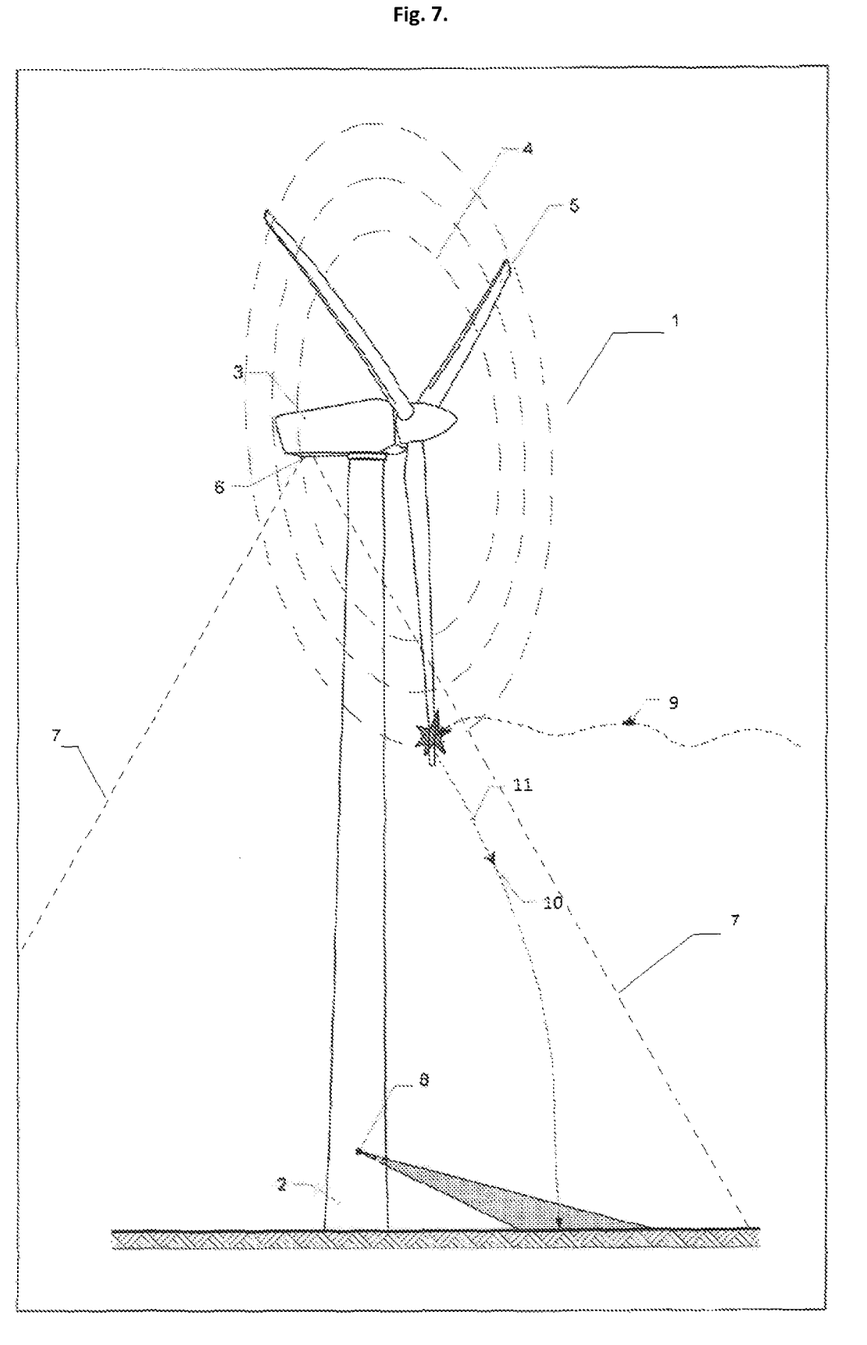
FIG. 7. Presents a scheme which shows the method according to the invention once an animal 9 collides with the wind turbine 1.

The system records the trajectory of animal 9 and identifies the position where it has fallen to the ground in the following manner. If a LIDAR sensor is used as sensor 6, the light beam emitted by a LIDAR sensor, when it meets the body of animal 9 on its way, returns to LIDAR receiver. The time between emitting the light beam and its return enables to obtain data on the location of the recorded animal 9 in space. The further the object is from a LIDAR sensor, the longer the time of return of the light beam reflected from an object. The so obtained data allow to recreate the trajectory 11 of the animal 9 flight and to read its speed and direction 10 of flight. Once a dead animal falls to the ground it rapidly loses speed, which makes it different from an alive animal, which must slowly decrease its speed and change the direction of flight 10 to avoid crashing into the ground. If 3D light field cameras are used as sensors, the position of the animal 9 with respect to the sensor 6 is recorded on the basis of the analysis of the direction of the recorded light rays reaching the sensor from a single point of a recorded scene. As a result, an image is produced containing information on the distance from the animal 9 to the sensor 6. If radars are used as sensors 6, the time between a signal emission and reception is measured. Example 6 is presented in FIG. 7.

The invention claimed is:

1. A system for recording collisions of flying animals with wind turbines and indicating a position where the flying animals fall to the ground, comprising:
  a wind turbine including a tower, a nacelle, and a rotor with blades; and
  a sensor system having a sensor and peripheral devices, wherein:
    the sensor is mounted on the nacelle and/or the tower,
    the sensor is a LIDAR sensor or a 3D light field camera or a 3D radar scanning a space around the wind turbine in a field of view of the sensor, and
    the sensor is configured to trace a trajectory of a falling animal after a collision with the wind turbine including continuously monitoring coordinates and speed of the falling animal in 3D space within a range of the field of view of the sensor once the falling animal has entered the field of view of the sensor until the falling animal has fallen to the ground.

2. The system, according to claim 1, wherein the sensor is mounted on the nacelle and has a horizontal field of view of 180°.

3. The system, according to claim 1, wherein the sensor is mounted on the tower and has a horizontal field of view of 360°.

4. The system, according to claim 1, wherein the sensor is a LIDAR sensor.

5. The system, according to claim 4, wherein the range of the sensor is about 300 m.

6. The system, according to claim 1, wherein the sensor is a 3D radar.

7. The system, according to claim 1, wherein the sensor is a 3D light field camera.

8. The system, according to claim 1, wherein the sensor is located on the tower below a rotor blade range.

9. The system, according to claim 1, further comprising:
  at least one device recording an image of the falling animal.

10. The system, according to claim 9, wherein the at least one device comprises one or more video cameras, night vision cameras, thermal imaging cameras, or photo cameras.

11. The system, according to claim 1, wherein the sensor system further comprises:
  one or more further sensors mounted on the nacelle and/or the tower in such manner that the one or more further sensors are configured to communicate with one another by way of wired or wireless communication and cover multiple fields of view in conjunction with the field of view of the sensor.

12. The system, according to claim 11, wherein the sensor and the one or more further sensors are located on the tower below a rotor blade range.

13. The system, according to claim 11, further comprising:
  at least one device recording an image of the falling animal.

14. The system, according to claim 13, wherein the at least one device comprises one or more video cameras, night vision cameras, thermal imaging cameras, or photo cameras.

15. A method for recording collisions of flying animals with wind turbines and indicating where they fell on the ground including a system comprising a wind turbine including a tower, a nacelle, and a rotor with blades, and a sensor system including a sensor and peripheral device, where the sensor is mount on the nacelle and/or the tower and the sensor is a LIDAR sensor, a 3D light field camera, or a 3D radar configured to scan a space around the wind turbine in a field of view of the sensor, the method comprising:
  tracing a trajectory of the flying animal using the sensor as the flying animal falls after the collision with the wind turbine; and
  obtaining an indication from the sensor that a collision occurred between a flying animal and the wind turbine, comprising:
    continuously monitoring one or more coordinates and a speed of the flying animal using the sensor as the flying animal falls in 3D space within a range of the field of view of the sensor from when the flying animal enters the field of view of the sensor until the flying animal contacts the ground.

16. A method for recording collisions of flying animals with wind turbines and indicating where they fell on the ground including a system comprising a wind turbine including a tower, a nacelle, and a rotor with blades, a sensor system including a sensor and peripheral device, where the sensor is mount on the nacelle and/or the tower and the sensor is a LIDAR sensor, a 3D light field camera, or a 3D radar configured to scan a space around the wind turbine in a field of view of the sensor, and one or more further sensors mounted on the nacelle and/or the tower in such manner that the one or more further sensors are configured to communicate with one another by way of wired or wireless communication and cover multiple fields of view in conjunction with the field of view of the sensor the method comprising:

tracing a trajectory of the flying animal using the sensor and the one or more further sensors as the flying animal falls after the collision with the wind turbine; and     obtaining an indication from the sensor and the one or more further sensors that a collision occurred between a flying animal and the wind turbine, comprising:

continuously monitoring one or more coordinates and a speed of the flying animal using the sensor and the one or more further sensors as the flying animal falls in 3D space within a range of a field of view of the sensor of the multiple fields of view of the one or more further sensors from when the flying animal enters the field of view of the sensor and the multiple fields of view of the one or more further sensors until the flying animal contacts the ground.

\* \* \* \* \*